(12) United States Patent
Howard et al.

(10) Patent No.: US 7,502,321 B2
(45) Date of Patent: *Mar. 10, 2009

(54) OPTIMIZATION OF SUBNETWORK BANDWIDTH BASED ON DESIRED SUBSCRIPTION RATES

(75) Inventors: Michael L. Howard, Sandy, UT (US); William R. Harper, Jr., Salt Lake City, UT (US); Bryant Eastham, Salt Lake City, UT (US)

(73) Assignee: Matsushita Electric Works, Ltd., Osaka (JP)

( * ) Notice: Subject to any disclaimer, the term of this patent is extended or adjusted under 35 U.S.C. 154(b) by 753 days.

This patent is subject to a terminal disclaimer.

(21) Appl. No.: 11/053,558

(22) Filed: Feb. 8, 2005

(65) Prior Publication Data
US 2005/0201282 A1 Sep. 15, 2005

Related U.S. Application Data

(63) Continuation of application No. 10/229,823, filed on Aug. 28, 2002, now Pat. No. 6,876,628.

(51) Int. Cl.
*G08C 15/00* (2006.01)
(52) U.S. Cl. .................. 370/232; 370/235; 370/391; 370/468; 370/537
(58) Field of Classification Search .......... 370/230, 370/230.1, 232, 233, 235, 236, 352, 353, 370/358, 391, 395.21, 395.52, 400, 401, 370/477, 537, 538, 543; 709/223, 225, 226, 709/250
See application file for complete search history.

(56) References Cited

U.S. PATENT DOCUMENTS 4,993,024 A 2/1991 Quinquis et al.

(Continued)

FOREIGN PATENT DOCUMENTS

EP 0 781 068 6/1997

(Continued)

OTHER PUBLICATIONS

Mohapatra, P. et al. "A Framework for Managing QoS and Improving Performance of Dynamic Web Content". IEEE Globecom '01. Nov. 25-29, 2001. vol. 4. pp. 2460-2464.

(Continued)

*Primary Examiner*—Chi H Pham
*Assistant Examiner*—Donald L Mills
(74) *Attorney, Agent, or Firm*—Austin Rapp & Hardman

(57) ABSTRACT

A system for optimizing network bandwidth based on subscription rates from a plurality of requestors is disclosed as including a provider that provides provider data. The system also includes a first requestor that has requested the provider data at a first subscription rate and a second requestor that has requested the provider data at a second subscription rate. The second subscription rate is higher than the first subscription rate. The system further includes a plurality of intervening access nodes. Each intervening access node includes request information specifying any provider data being sent through the intervening access node and a corresponding subscription rate. The plurality of intervening access nodes are configured to decrease the rate to an adjacent node when a requestor decreases a requestor subscription rate such that all the rates along a common transmit path from the provider to an end requestor are optimized to maximize available bandwidth.

15 Claims, 7 Drawing Sheets

U.S. PATENT DOCUMENTS

| | | | |
|---|---|---|---|
| 5,029,164 | A | 7/1991 | Goldstein et al. |
| 5,115,429 | A | 5/1992 | Hluchyj et al. |
| 5,163,046 | A * | 11/1992 | Hahne et al. ............... 370/237 |
| 5,231,631 | A | 7/1993 | Buhrke et al. |
| 5,274,641 | A * | 12/1993 | Shobatake et al. ........... 370/392 |
| 5,319,638 | A | 6/1994 | Lin |
| 5,802,287 | A | 9/1998 | Rostoker et al. |
| 6,139,177 | A | 10/2000 | Venkatraman et al. |
| 6,236,662 | B1 * | 5/2001 | Reilly ........................ 370/462 |
| 6,349,091 | B1 * | 2/2002 | Li ............................... 370/238 |
| 6,366,559 | B1 | 4/2002 | Krishnan et al. |
| 6,480,497 | B1 | 11/2002 | Flammer et al. |
| 6,735,633 | B1 | 5/2004 | Welch et al. |
| 6,876,628 | B2 | 4/2005 | Howard et al. |
| 2001/0038674 | A1 * | 11/2001 | Trans ........................ 375/355 |
| 2002/0064149 | A1 * | 5/2002 | Elliott et al. ................. 370/352 |
| 2002/0107908 | A1 | 8/2002 | Dharanikota |
| 2002/0131363 | A1 | 9/2002 | Beshai et al. |
| 2002/0196490 | A1 * | 12/2002 | Smith ........................ 359/118 |
| 2003/0016770 | A1 * | 1/2003 | Trans et al. ................. 375/346 |

FOREIGN PATENT DOCUMENTS

| | | |
|---|---|---|
| EP | 1 001 574 | 5/2000 |
| WO | WO 99/14908 | 3/1999 |

OTHER PUBLICATIONS

Goldszmidt, G.S. "Load Management for Scaling Up Internet Services". IEEE Network Operations and Management Symposium, 1998. Feb. 15-20, 1998. vol. 3. pp. 828-835.

"On Multicast Transfer of Hierarchically Coded Video with QoS Guarantees," Wakamiya et al., pp. 294-300.

Wakamiya, N. et al., "On Multicast Transfer of Hierarchically coded video with QoS Guarantees," Internet Workshop, IWS 99. Feb. 1999, pp. 294-300.

* cited by examiner

OPTIMIZATION OF SUBNETWORK BANDWIDTH BASED ON DESIRED SUBSCRIPTION RATES

CROSS-REFERENCE TO RELATED APPLICATION

This application is a continuation of U.S. patent application Ser. No. 10/229,823, filed Aug. 28, 2002, and now issued as U.S. Pat. No. 6,876,628.

TECHNICAL FIELD

This invention relates generally to computer networks, and is more particularly directed toward optimizing subnetwork bandwidth based on desired subscription rates.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, of processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor(s).

As stated, embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc.

Some embedded systems may provide data and/or services to other computing devices using a computer network. These requesting computing devices may request that the data and/or service be provided at specified rates. Sometimes the computer networks providing the communication of this information do not provide sufficient and/or desirable means for optimizing the bandwidth used for this communication. Benefits may be realized if systems and methods were provided to optimize subnetwork bandwidth based on desired rates of the requesting computing devices.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

Figure 1:
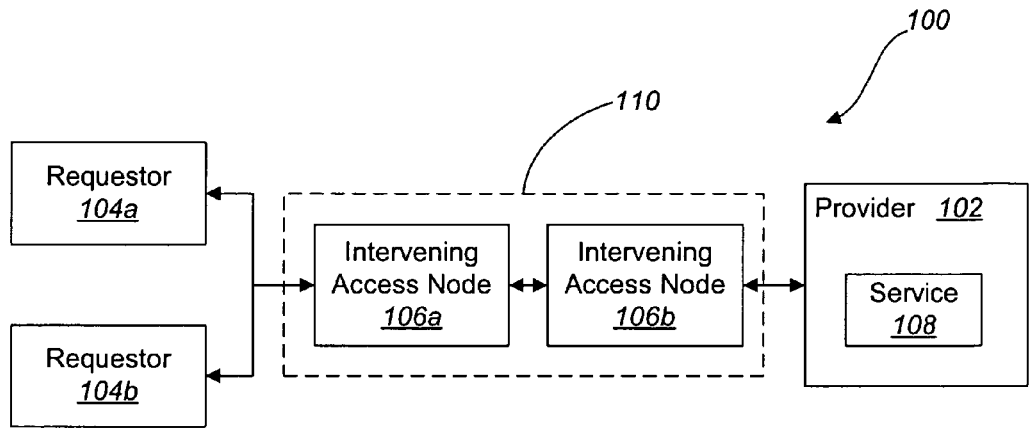
FIG. 1 is a network block diagram illustrating two intervening access nodes in a computer network.

It will be readily understood that the components of the embodiments as generally described and illustrated in the Figures herein could be arranged and designed in a wide variety of different configurations. Thus, the following more detailed description of the embodiments of the methods and apparatus of the present invention, as represented in the Figures, is not intended to limit the scope of the invention, as claimed, but is merely representative of the embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are shown to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

A system for optimizing network bandwidth based on subscription rates from a plurality of requestors is disclosed as including a provider that provides provider data. A subscription is a time-based or a change-based update. The system also includes a first requester that has requested the provider data at a first subscription rate and a second requestor that has requested the provider data at a second subscription rate. The second subscription rate is higher than the first subscription rate. The system further includes a plurality of intervening access nodes. Each intervening access node includes request information specifying any provider data being sent through the intervening access node and a corresponding subscription rate. The plurality of intervening access nodes are configured to decrease the rate to an adjacent node when a requestor decreases a requestor subscription rate such that all the rates along a common transmit path from the provider to an end requestor are optimized to maximize available bandwidth.

Embedded devices may be used with the system. For example, the provider may be an embedded device. In addition, one or more of the requestors may be embedded devices.

As stated, the system includes a plurality of intervening access nodes. The plurality of intervening access nodes may comprise an intervening access node network.

The provider may be a provider of web services. If the provider is a provider of web services, the provider data may relate to the one or more web services.

The request information may be embodied in various forms. In one embodiment, the request information includes a data ID identifying data being received. The request information may also include a next node describing where the data being received is to be sent. A subscription rate may also be included.

In another embodiment, the request information may include an I/O channel identifying a channel. The request information may also include a node describing where the data being received is to be sent. Requests may also be included that identify any requests for the data being received from an I/O channel and corresponding subscription rates.

Each of the intervening access nodes may be further configured such that when the second requestor reduces the second subscription rate to a new rate at or lower than the first subscription rate, the intervening access nodes along the common transmit path from the provider to the first requestor and the second requester decrease the rate to the first subscription rate thereby optimizing available bandwidth. In addition, the intervening access nodes are also configured such that when the first requestor reduces the first subscription rate, the intervening access nodes along the common transmit path from the provider to the first requestor and the second requestor keep the same rate.

A method is also disclosed for optimizing network bandwidth based on subscription rates from a plurality of requesters subscribed to services from a provider. The plurality of requesters are in electronic communication with the provider through a computer network. An embedded provider provides provider data that relates to a web service. A first requestor requests the service at a first subscription rate. A second requestor requests the service at a second subscription rate. The second subscription rate is higher than the first subscription rate. Information between the requestors and the embedded provider is communicated by a plurality of intervening access nodes on the computer network. Each intervening access node includes request information specifying any provider data being sent through the intervening access node and a corresponding subscription rate. The plurality of intervening access nodes are configured to decrease the rate to an adjacent node when a requestor decreases a requestor subscription rate such that all the rates along a common transmit path from the embedded provider to an end requestor are optimized to maximize available bandwidth.

FIG. 1 is a network block diagram illustrating two intervening access nodes in the network 100. A provider 102 is in electronic communication with the network 100. The network embodiment 100 of FIG. 1 includes two requesters 104 in electronic communication with the network 100. The intervening access nodes 106 are also on the network 100. There may be more nodes on the network 100.

An intervening access node 106 is a network node that provides features and services to the network 100. An intervening access node 106 may be used in a variety of ways. For example, an intervening access node 106 may be present on a network to provide services to computers, applications and/or objects on the network 100. An intervening access node 106 may also be used to provide a protocol converter. An intervening access node 106 may be embedded or it 106 may be large enough to handle enterprise traffic.

One feature that an intervening access node 106 may include relates to object refinement. Object refinement refers to the situation where an intervening access node 106 places itself in place of an object and provides different implementations of the same interfaces. This allows, among other things, for problems in the implementation of an interface to be fixed without changing the actual end provider of the interface.

An additional feature of an intervening access node 106 is that of object augmentation. Object augmentation is where the intervening access node 106 adds new interfaces to an object that the end provider does not support.

In current design, the intervening access node 106 does not differentiate between clients and devices, so any service added is available to any (authorized) connected entity or node.

The network as shown in FIG. 1 may inherit many features of web services. Web services are accessed using web protocols, usually HTTP and SOAP. The architecture is based on the peer-to-peer paradigm of networking.

Figure 11:
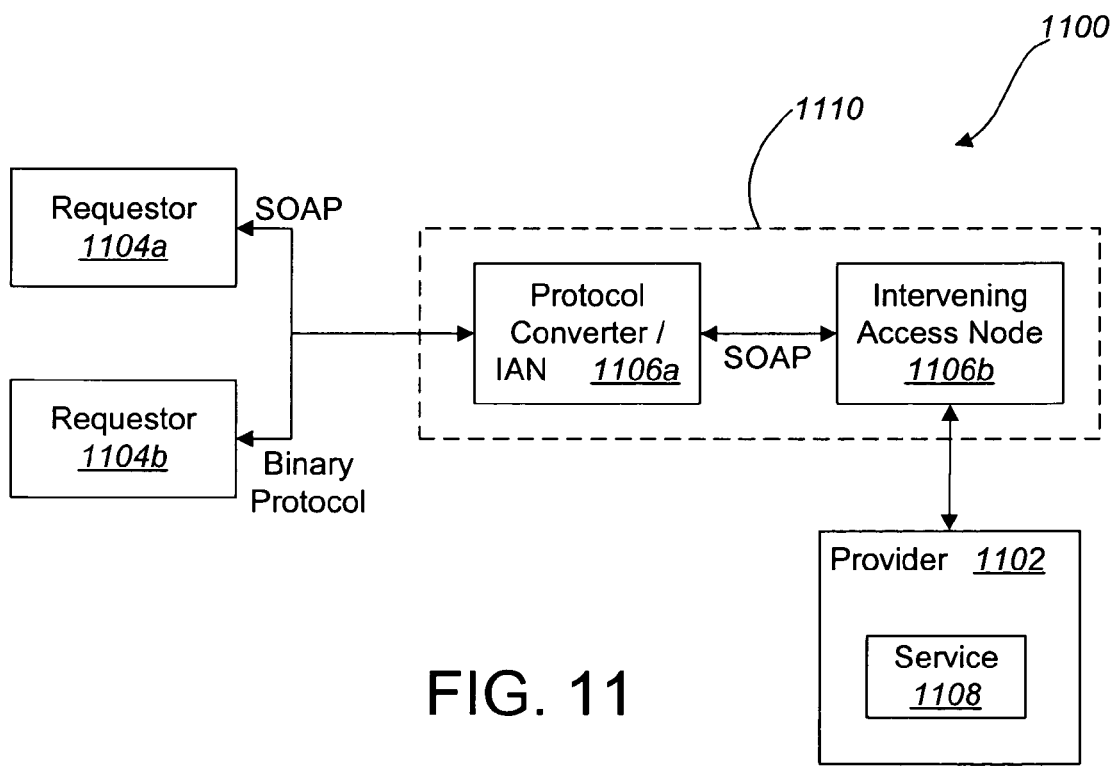
FIG. 11 is a network block diagram illustrating an intervening access node serving as a protocol converter.

Multiple intervening access nodes 106 in communication with one another form an intervening access node network 110 (referenced as 1110 in FIG. 11). To requestors 104 and/or providers 102, the one or more intervening access nodes 106 of the intervening access node network 110 appear as a single intervening access node 106. The size or number included in the intervening access node network 110 is transparent to providers 102 and/or requestors 104.

A provider 102 is a node on the network 100 that is the source of a service 108. A requestor 104 is a node on the network 100 that is the user of the service 108. A requestor 104 is a software entity implemented on a node that may directly discover a provider 102 and use the aspects of service(s) 108 to control or interact with it.

The service 108 may be any kind of service that may be provided by a computing device. Some possible examples of services 108 include providing temperature data from a location, providing surveillance data, providing weather information, providing an audio stream, providing a video stream, etc. Those skilled in the art will appreciate the many different kinds of services and/or data that may be provided over a computer network 100 from a provider 102.

The provider 102 may be an embedded provider. An embedded provider is a provider 102 being implemented on an embedded device. An embedded device is a type of computing device that does not include all the same components associated with a typical desktop computer. For example, some embedded devices do not include monitors, others do not include a keyboard or a mouse, and some embedded devices do not include either a monitor or a keyboard/mouse. Many embedded devices are microcontroller-based devices, i.e., the central processor for the embedded device is a microcontroller. Embedded devices will be discussed in relation to FIG. 10.

The term "network" as used herein refers to a system in which a series of nodes are interconnected by a communications path. A node is a physical computing device that communicates with other nodes. The specific behavior of a node is determined by the applications or software it executes. Applications running on nodes of a network communicate with each other through software modules that implement protocols, formalized rules for how data is sent over a network. Some protocols deal with the timing, sequencing, and error checking of data transmission. Others deal more with how the data is formatted and the commands and responses that the nodes exchange. A set of protocols that work together is called a protocol stack, with each protocol acting as a layer in the stack that is built on top of another layer. The top layer of a protocol stack is used by an application, the middle layers deal with transferring groups (packets and frames) of data between nodes, and the bottom layer deals directly with the networking hardware that transfers data.

Physical networks consist of nodes that are connected by some sort of physical medium (e.g., electrical wire, optical fiber, air). This physical connection may sometimes be referred to as a link. A physical network limited to two nodes may be referred to as point-to-point, while a physical network that may support more than two nodes may be referred to as multiple-access. Each node on a multiple-access network has a physical address that is used to distinguish it from the other nodes on the network.

Logical networks may be superimposed onto physical networks to specify a unique group of nodes. Each node in a logical network has a logical address that is mapped by a protocol to the node's physical address. A sub-network, or subnet, is a physically or logically independent portion of a network, distinguished by a subnet number.

Most protocols deal with logical networks because most physical network issues already have many well-defined implementations and defining new physical layers is not required. Logical networks also have the benefit of being insulated from the physical network, and are therefore more generally useful. For example, TCP/IP is defined on top of a logical network (IP). IP can run on many physical networks (Ethernet, serial, wireless, etc.). This makes TCP/IP a more generic solution than had it been defined only in terms of some specific physical network.

Figure 2:
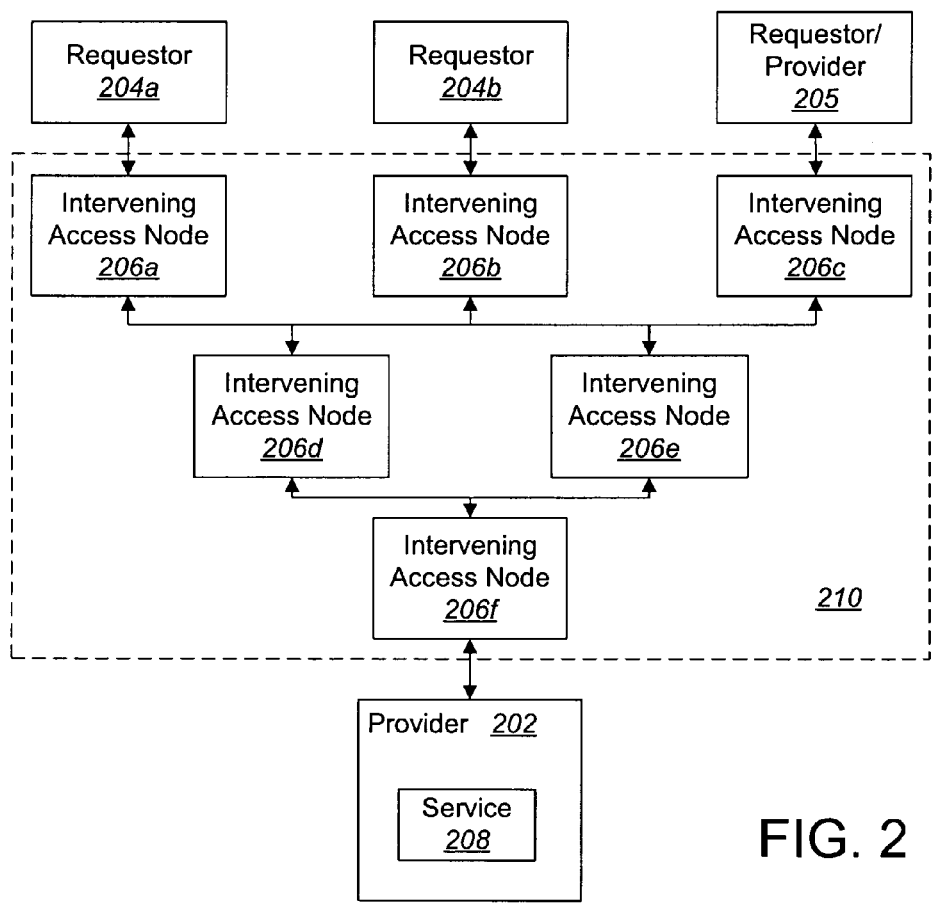
FIG. 2 is a network block diagram illustrating several intervening access nodes in a computer network.

Any number of intervening access nodes 106 may be used in a network 100. FIG. 2 illustrates a network 200 that includes a number of intervening access nodes 206 as shown. Three requestors 204 are in electronic communication with the intervening access nodes 206. In the network embodiment 200 shown in FIG. 2, the three requestors 204 all request the services 208 being provided by the provider 202. The data from the services 208 is sent through the intervening access node network 210.

The intervening access node network 210 of FIG. 2 operates similarly to the intervening access node network 110 of FIG. 1. In typical operation, the requestors 104, 204 and the providers 102, 202 would not distinguish between the intervening access node network 110 of FIG. 1 and the intervening access node network 210 of FIG. 2. FIG. 2 also illustrates that a node may serve as both a requestor and a provider, as shown by the illustrated requestor/provider 205.

Figure 3:
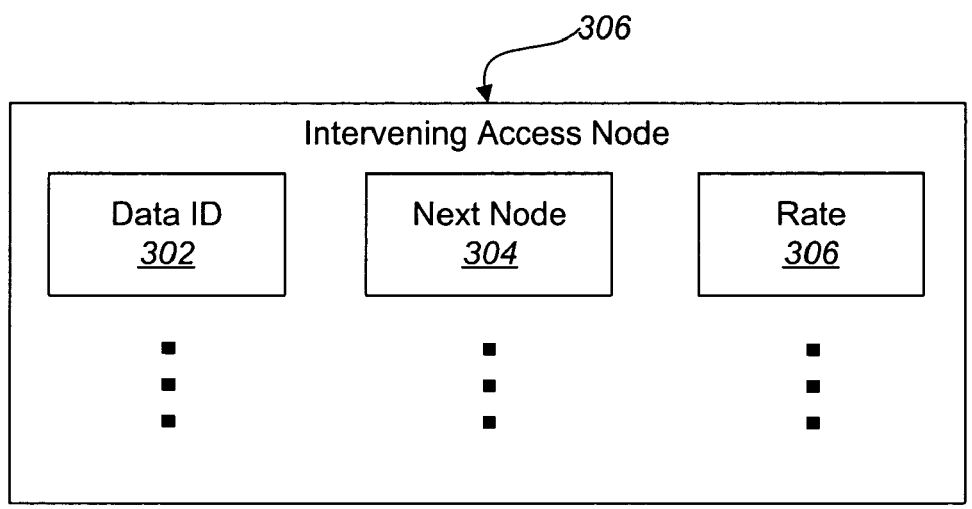
FIG. 3 is a block diagram of an embodiment of an intervening access node.

FIG. 3 is a block diagram of an embodiment of an intervening access node 306. The intervening access node 306 stores the information necessary for it 306 to send data toward its destination. There are a variety of ways in which the intervening access node 306 may store information to track where different data transmissions are to be sent. The intervening access node 306 of FIG. 3 stores a data ID 302, a next node 304 and a rate 306. The data ID 302 field identifies the data or data stream coming into the intervening access node 306. The next node 304 field indicates where this intervening access node 306 is to send the data, that is, it indicates the next node that is to receive the data. The rate 306 indicates at what rate the data is being transmitted. The rate 306, at times, may also be referred to as a subscription rate. A subscription is a time-based or a change-based update. Typically the rate requested by a requestor 104 is referred to as a subscription rate. The rates among intervening access nodes 106 relate to the subscription rates in that they are determined by the subscription rates of the requestors. Intervening access nodes 106 receive data at a rate sufficient such that the requestor receives the data at the desired subscription rate.

Figure 4:
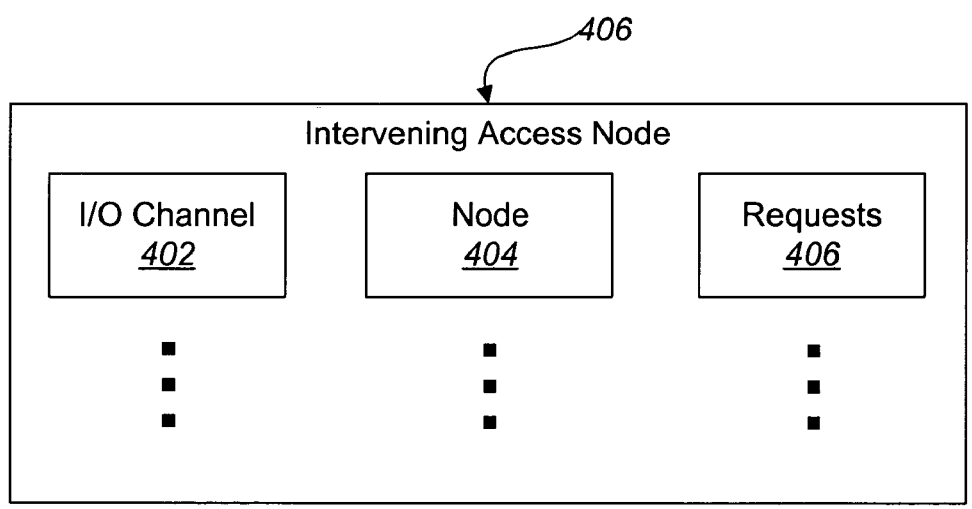
FIG. 4 is a block diagram of another embodiment of an intervening access node.

FIG. 4 is a block diagram of another embodiment of an intervening access node 406. The intervening access node 406 stores the information necessary for it to send data toward its destination. The intervening access node 406 of FIG. 4 stores an I/O Channel 402, a node 404 and registered requests 406. The I/O channel 402 field identifies the input/output communication channel. The node 404 field identifies the next node that is to receive the data and/or identifies the I/O channel 402 through which the data is to be sent. The registered requests 406 field indicates what requests there are for the data coming in through the associated I/O channel 402 as well as what rate was requested.

Figure 5:
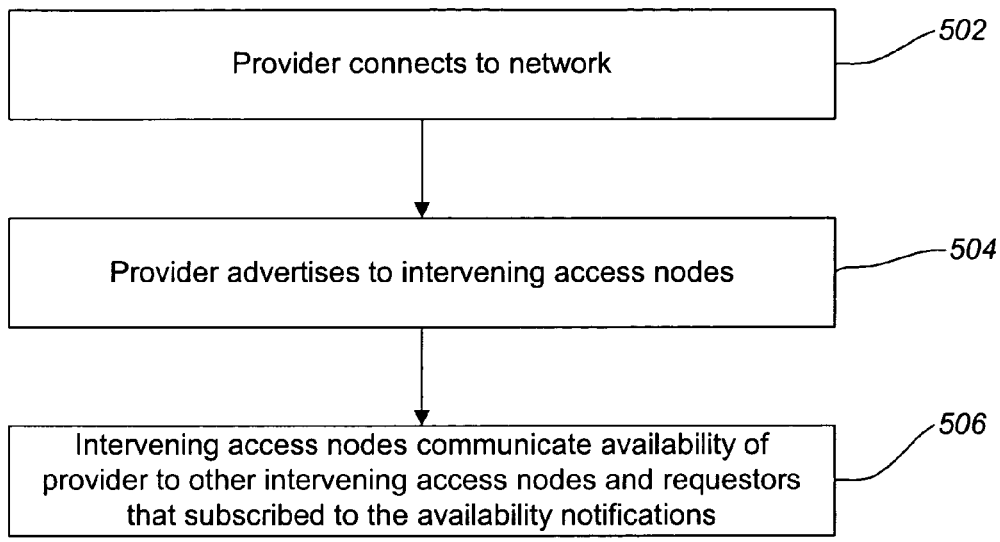
FIG. 5 is a flow diagram of an embodiment of a method of a provider connecting to a network.

FIG. 5 is a flow diagram of an embodiment of a method of a provider 102 connecting to a network 100. The provider 102 connects 502 to the network 100. Then the provider 102 advertises 504 its availability to the network 100. When the provider 102 advertises 504 its availability, its advertisements are received by the intervening access nodes 106 on the network 100. The intervening access nodes 106 then communicate 506 the availability of the provider 102 to any other intervening access nodes 106 and/or requestors 104 that have subscribed to receive availability notifications. The new provider advertisement that is communicated to one or more nodes may be referred to as an availability notification. These availability notifications may be subscribed to like any other service that may be subscribed to.

One or more intervening access nodes 106 may be configured to serve as a directory. A directory is a node that provides information to other nodes regarding availability of providers and how to communicate with such providers. Any intervening access nodes 106 serving as directories would store the provider 102 information in the directory.

The roles of requestor and provider can be taken on by devices and software nodes connected to intervening access nodes 106. In addition, an intervening access node 106 may be a requestor and/or a provider. For example, the intervening access node 106 may be a requestor/provider when setting up the communication between intervening access nodes 106. An intervening access node 106 serves as a requestor when it 106 requests information about providers when it 106 connects to another intervening access node 106. An intervening access node 106 serves as provider when it is providing information about other providers to other intervening access nodes 106.

Figure 6:
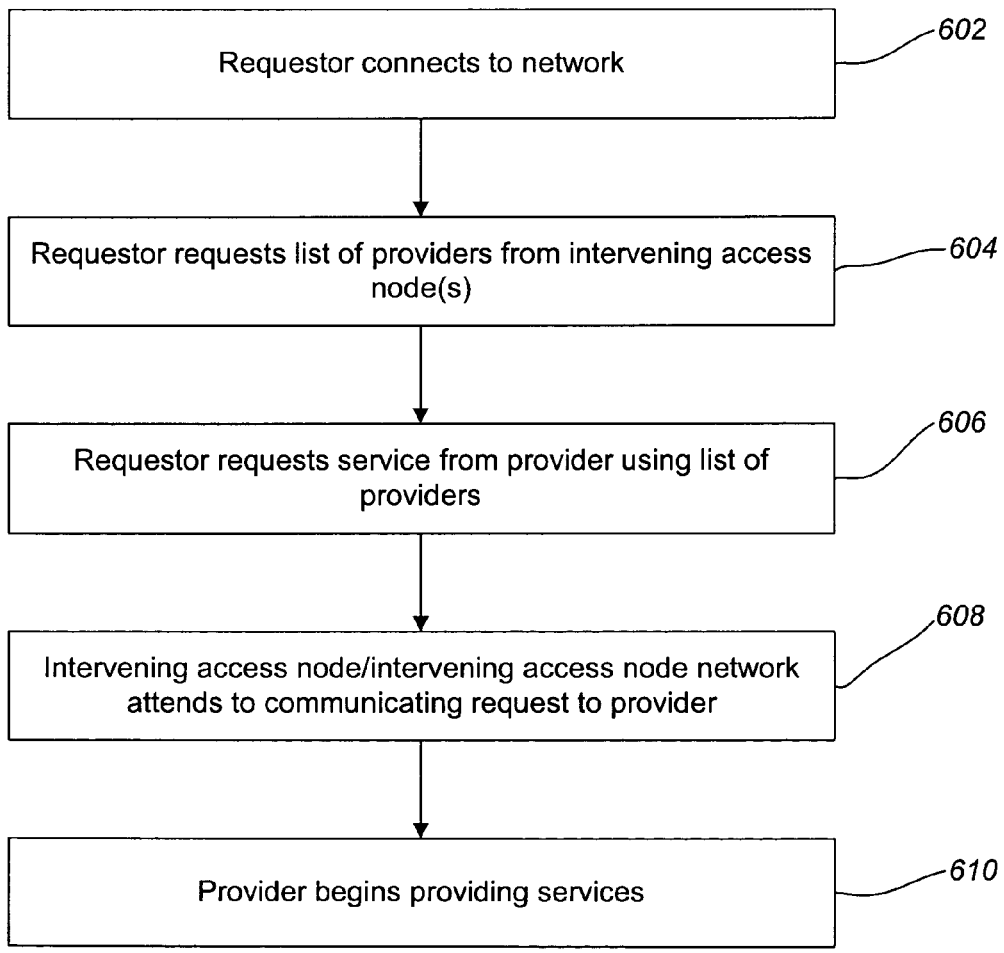
FIG. 6 is a flow diagram of an embodiment of a method of a requestor establishing a service communication link with a provider.

FIG. 6 is a flow diagram of an embodiment of a method of a requestor 104 establishing a service communication link with a provider 102. The requestor 104 connects 602 to the network 100. Then the requestor 104 may request 604 a list of providers 102 from the intervening access node(s) 106. Using the list of providers 102, the requestor is able to determine what service it needs and it requests 606 the service from a provider 102. The intervening access node network 110 communicates 608 the request from the requestor 104 to the provider 102. The provider 102 then begins providing 610 the service(s) requested.

Figure 7:
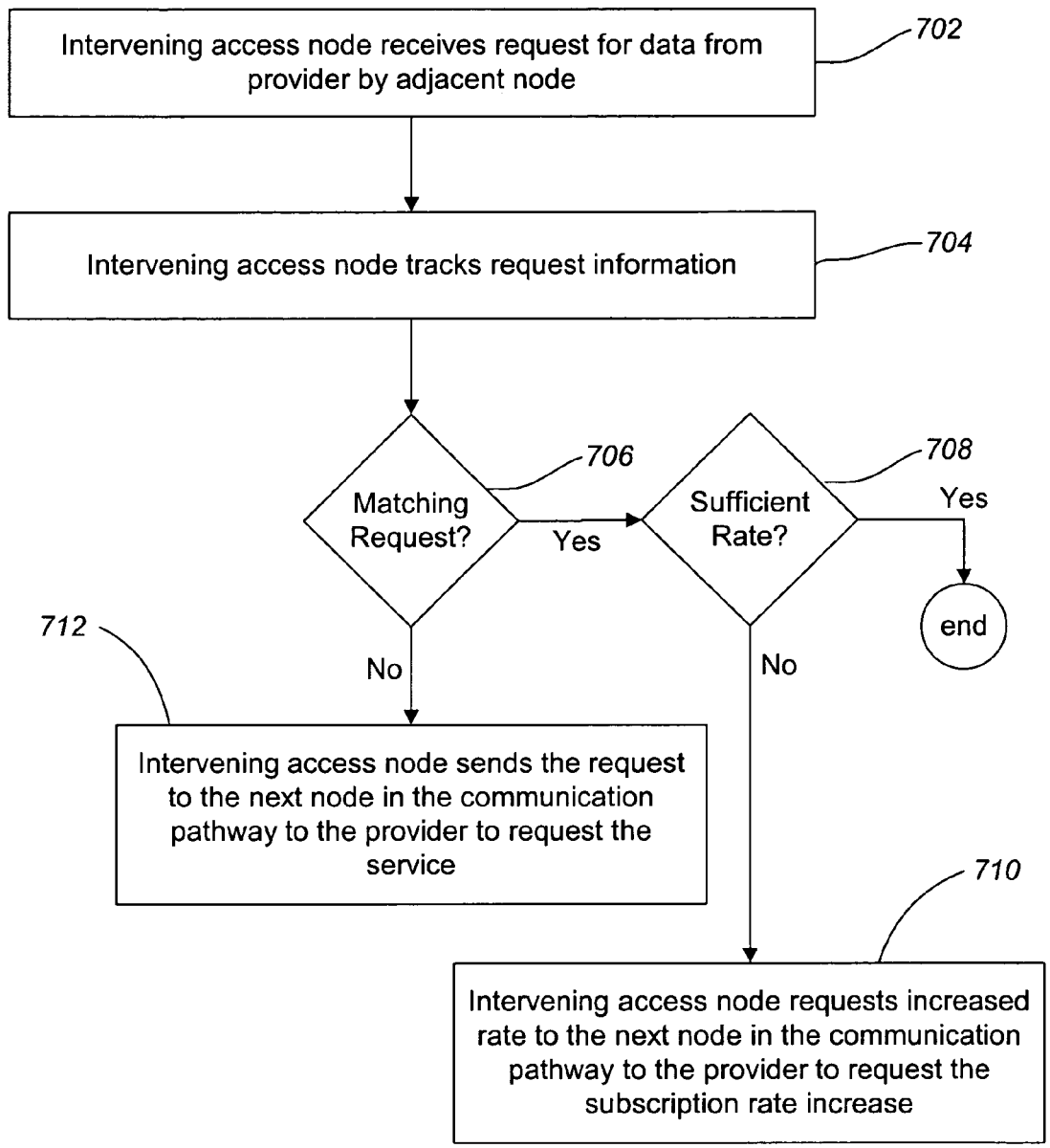
FIG. 7 is a flow diagram of an embodiment of a method of an intervening access node processing a request for services to be sent to a provider.

FIG. 7 is a flow diagram of an embodiment of a method of an intervening access node 106 processing a request for services to be sent to a provider 102. Generally, the intervening access node 106 determines whether it 106 is already receiving the service at a sufficient rate to satisfy the request. If it is, the intervening access node 106 may simply store the new request information and begin providing the data from the service to the new node.

The intervening access node 106 receives 702 the request for the service by an adjacent node. The adjacent node may be another intervening access node 106 or it may be the requestor 104. The intervening access node 106 tracks 704 or stores the request information. Then the intervening access node 106 determines 706 whether there is a matching request. A matching request means that the same data is already being received. If there is a matching request, then the intervening access node 106 determines 708 if the data was being received at a sufficient rate. If the data was already being received at a sufficient rate, the intervening access node 106 does not need to propagate the request further and will transmit the data to the new node as indicated by the information it stored in the tracking 704 step. If the intervening access node 106 determines 708 that the rate is not sufficient, then the intervening access node 106 sends the request 710 to the next node in the communication pathway to the provider 102 to request an increased rate. Referring to the matching determination 706, if the intervening access node 106 determines 706 that there is not a matching request, then the intervening access node 106 sends 712 the request to the next node in the communication pathway to the provider 102 to request the service.

Figure 8:
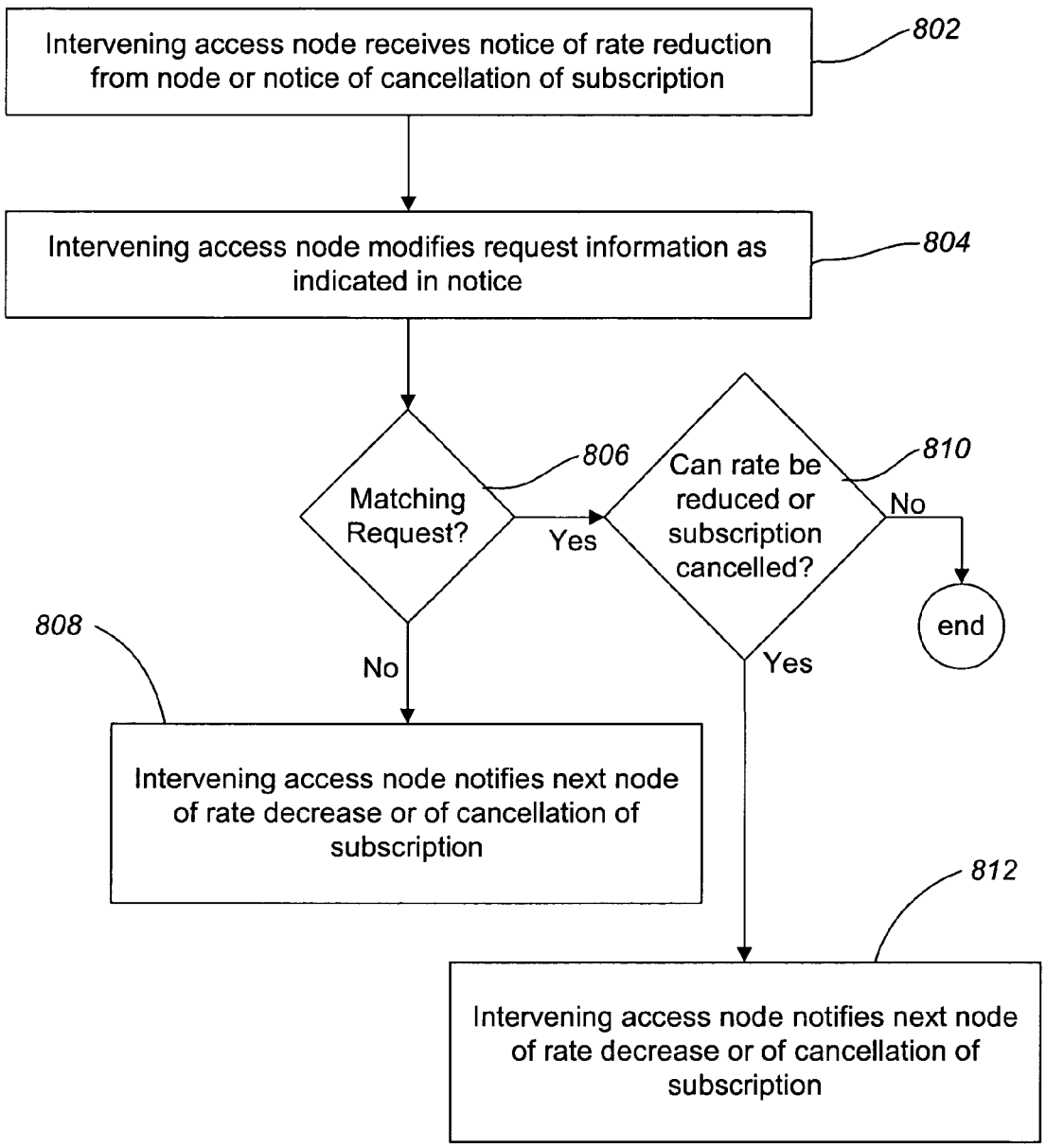
FIG. 8 is a flow diagram of an embodiment of a method of an intervening access node processing a request to cease a service or to reduce the rate of data being received from a service.

FIG. 8 is a flow diagram of an embodiment of a method of an intervening access node 106 processing a request to cease a service or to reduce the rate of data being received from a service. Generally, the intervening access node 106 determines whether another requestor or node needs the service at a rate such that it cannot be reduced or whether the request to cease the service or decrease the rate should be forwarded on to the next node in the communication pathway to the provider 102 to request the service.

The intervening access node 106 receives 802 the notice of a rate reduction for the service or a notice of cancellation of service subscription by an adjacent node. The adjacent node may be another intervening access node 106 or it may be the requestor 104. The intervening access node 106 modifies 804 the information at the intervening access node 106 to reflect the request. Then the intervening access node 106 determines 806 whether there is a matching request. A matching request means that the same data is already being received. If there is not a matching request, then the intervening access node 106 sends 808 the request on to the next node in the communication pathway to the provider 102 to request the cancellation of subscription or subscription rate reduction. If there is a matching request, then the intervening access node 106 determines 810 if the rate may be reduced or if the subscription may be cancelled. For example, assume there is one data ID of ABC being received and sent to two next nodes, NextNode1 and NextNode2, at rates of 1 Khz for NextNode1 and 2 Khz for NextNode2If NextNode2 requested that its rate is to be reduced to 1 Khz, the intervening access node 106 would determine that the rate of data ID ABC may be reduced to 1 Khz because of the rate reduction from NextNode2. However, if the NextNode1 requested that its rate be reduced to 500Hz, the intervening access node 106 would determine that the rate of data ID ABC cannot be reduced because the higher 2 Khz rate is still needed by NextNode2. Referring back to FIG. 8, if the rate can be reduced or if the subscription can be cancelled, the intervening access node 106 notifies 812 the next node in the communication pathway to the provider 102 of the cancellation of subscription or of the rate reduction. If the rate is not to be reduced, the intervening access node 106 ends processing the service rate reduction or cancellation of subscription.

Figure 9:
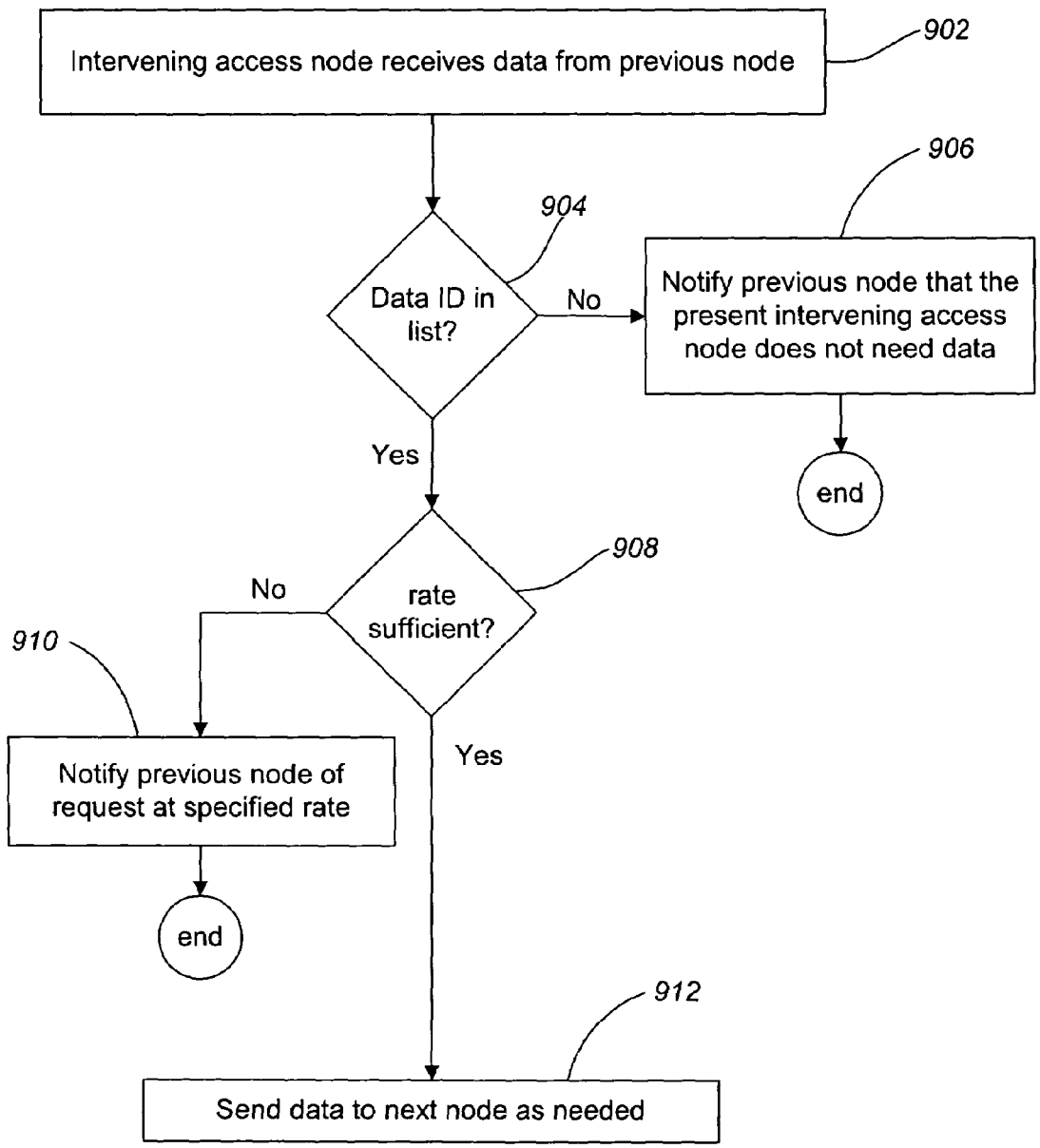
FIG. 9 is a flow diagram of an embodiment of a method of an intervening access node processing data received from a node in the communication pathway to the provider of the service originating the data.

FIG. 9 is a flow diagram of an embodiment of a method of an intervening access node 106 processing data received from a node in the communication pathway to the provider 102 of the service originating the data (referred to as an "upstream node"). The intervening access node 106 receives 902 data from the upstream node. The intervening access node 106 then determines 904 whether it should be receiving the data. Depending on how the intervening access node 106 tracks the data or channels it is receiving, it 106 may determine this in various ways. For the embodiment of the intervening access node 106 shown in FIG. 3, the node 106 may check the data ID 302 field to determine whether it should be receiving the data. For the embodiment shown in FIG. 4, the node 106 may check to see that the data is coming in through an I/O channel 402 listed. If the intervening access node 106 determines that it should not be receiving the data, it notifies 906 the upstream node. If the intervening access node 106 determines that it should be receiving the data, it continues processing as shown.

The intervening access node 106 may then determine 908 if the rate matches the maximum rate needed. If the rate is not sufficient, the node 106 notifies 910 the upstream node of the request at the necessary rate. If the rate is sufficient, then the node 106 may send 912 the data on to the next node toward the requester 104 (referred to as a "downstream node").

Figure 10:
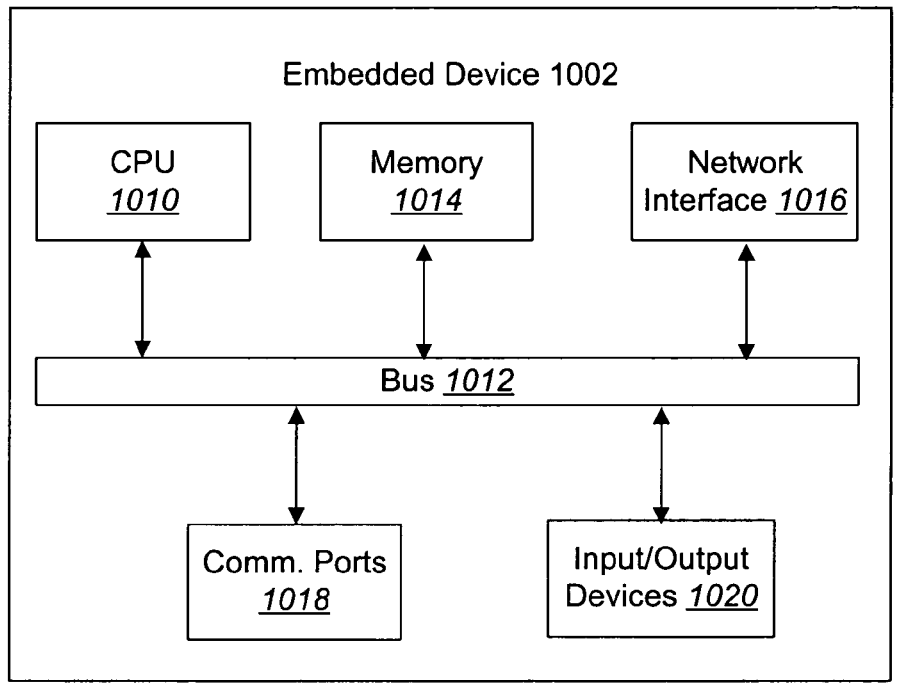
FIG. 10 is a block diagram of hardware components that may be used in an embodiment of an embedded device.

FIG. 10 is a block diagram of hardware components that may be used in an embodiment of an embedded device which may be used as either an embedded provider or as an embedded requestor.

A CPU 1010 or processor may be provided to control the operation of the embedded device 1002, including the other components thereof, which are coupled to the CPU 1010 via a bus 1012. The CPU 1010 may be embodied as a microprocessor, microcontroller, digital signal processor or other device known in the art. The CPU 1010 performs logical and arithmetic operations based on program code stored within the memory 1014. In certain embodiments, the memory 1014 may be on-board memory included with the CPU 1010. For example, microcontrollers often include a certain amount of on-board memory.

The embedded device 1002 may also include a network interface 1016. The network interface 1016 facilitates communication between the embedded device 1002 and other devices connected to the network 100. The network 100 may be a pager network, a cellular network, a global communications network, the Internet, a computer network, a telephone network, etc. The network interface 1016 operates according to standard protocols for the applicable network 100.

The embedded device 1002 may also include memory 1014. The memory 1014 may include a random access memory (RAM) for storing temporary data. Alternatively, or in addition, the memory 1014 may include a read-only memory (ROM) for storing more permanent data, such as fixed code and configuration data. The memory 1014 may also be embodied as a magnetic storage device, such as a hard disk drive. The memory 1014 may be any type of electronic device capable of storing electronic information.

The embedded device 1002 may also include communication ports 1018, which facilitate communication with other devices. The embedded device 1002 may also include input/output devices 1020, such as a keyboard, a mouse, a joystick, a touchscreen, a monitor, speakers, a printer, etc.

FIG. 11 is a network block diagram illustrating an intervening access node 1106a in a network 1100 serving as a protocol converter. The diagram is similar to the diagram illustrated in relation to FIG. 1. It will be appreciated by one skilled in the art that many different protocols may be used with embodiments herein and that any exemplary embodiments are not meant to limit the use of the inventive principles set forth. Generally, an intervening access node 1106a may also serve as a protocol converter to convert from one protocol to another. The example of FIG. 11 illustrates the use of a protocol converter.

A provider 1102 is in electronic communication with the network 1100. The network embodiment 1100 of FIG. 1 includes two requestors 1104 in electronic communication with the network 1100. The intervening access nodes 1106 are also on the network 1100. There may be more nodes on the network 1100.

As shown, SOAP is being used between a first intervening access node 1106b and a second intervening access node 1106a. However, a first requestor 1104a will be using SOAP to receive the service 1108, while a second requestor 1104b will be using a binary protocol (e.g., RPC). An intervening access node 1106a may function as a protocol converter to provide the binary protocol to the second requestor 1104b. When acting as a protocol converter, the intervening access node 1106a converts the incoming protocol to the desired protocol so that the node 1106a may transmit the desired protocol on to the next node. The node 1106a also provides the SOAP communication to any nodes that need the communication in a SOAP format. Thus, although only one protocol was being received, more than one protocol is being provided by the intervening access node 1106a serving as a protocol converter.

There are many types of embedded devices and many reasons for creating device networks. Several examples of device networking applications will be set forth. It will be appreciated by those skilled in the art that the examples discussed are not exhaustive.

One example of a device networking application is remote monitoring. Many useful device networks involve remote monitoring, the one-way transfer of information from one node to another. In these applications, providers typically act as small servers that report certain information in response to a requester. Providers can also be set up to publish their state information to subscribers. A requestor may ask for periodic reports or for updates whenever the state changes, perhaps with some means of limiting how often updates are to be sent. Providers can be set up to notify requesters when some event or exceptional condition occurs.

Another example of a device network application is remote control, where requestors are able to send commands to providers to invoke some specific action. In most cases, remote control involves some sort of feedback.

A still further example of a device networking application is distributed control systems. The functions and data associated with individual providers can be combined and coordinated through a network to create a distributed system that provides additional value. Sometimes these distributed control systems can be established more or less automatically. In many cases, a more sophisticated device joins a peer-to-peer network to perform configuration, monitoring or diagnostic duties. Such systems may be created by objects that communicate as peers or through a master-slave configuration, in which each object in the system communicates with a single, central node that contains all of the control logic.

With each category of networking application, there are a variety of ways in which requesters may connect to providers. When a relatively small number of providers are involved a requestor may use a web browser, pager or even a WAP-enabled cell phone to communicate with a provider in a more or less interactive manner. As the number of providers grows, however, these methods may become unworkable and requestors may employ more general data management techniques such as a spreadsheet or database application.

As a variety of networks are implemented over time and with different technologies, the situation can arise in which multiple networks might sit in the same home or facility, each using their own protocols and unable to communicate with the others. In this case the various networks and protocols can be bridged to create a single, larger network. This can allow a single application to access each provider, simplifying the interaction with all of the providers.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A system for optimizing network bandwidth based on subscription rates from a plurality of requestors, the system comprising:
   a provider that provides provider data;
   a first requestor that has requested the provider data at a first subscription rate;
   a second requestor that has requested the provider data at a second subscription rate, wherein the second subscription rate is higher than the first subscription rate; and
   a plurality of intervening access nodes, wherein each intervening access node includes request information specifying any provider data being sent through the intervening access node and a corresponding subscription rate, and wherein the plurality of intervening access nodes are configured to decrease the rate to an adjacent node when a requestor decreases a requestor subscription rate such that all the rates along a common transmit path from the provider are optimized to maximize available bandwidth, and wherein the common transmit path ends at a first intervening access node and two different transmit paths communicate the provider data to the first requestor and the second requestor from the first intervening access node, such that the provider data is communicated from the provider, through the common transmit path to the first intervening access node at the second subscription rate, and from the first intervening access node to the first requestor at the first subscription rate, and from the first intervening access node to the second requestor at the second subscription rate.

2. The system as defined in claim 1, wherein the provider is an embedded device.

3. The system as defined in claim 1, wherein at least one requestor is an embedded device.

4. The system as defined in claim 1, wherein at least one of the intervening access nodes is an embedded device.

5. The system as defined in claim 1, wherein the plurality of intervening access nodes comprise an intervening access node network.

6. The system as defined in claim 1, wherein the provider is providing one or more web services and wherein the provider data relates to the one or more web services.

7. The system as defined in claim 1, wherein the request information comprises a data ID identifying data being received, a next node describing where the data being received is to be sent and a subscription rate of the data being received.

8. The system as defined in claim 1, wherein the request information comprises an I/O channel identifying a channel, a node describing where the data being received is to be sent and requests identifying any requests for the data being received from an I/O channel and corresponding subscription rates.

9. The system as defined in claim 1, wherein each of the intervening access nodes are further configured such that when the second requestor reduces the second subscription rate to a new rate at or lower than the first subscription rate, the intervening access nodes along the common transmit path from the provider to the first requestor and the second requestor decrease the rate to the first subscription rate thereby optimizing available bandwidth.

10. The system as defined in claim 1, wherein each of the intervening access nodes are further configured such that when the first requestor reduces the first subscription rate, the intervening access nodes along the common transmit path from the provider to the first requestor and the second requestor keep the same rate.

11. An embedded intervening access node comprising:
 a processor;
 a network interface in electronic communication with the processor;
 memory in electronic communication with the processor for storing request information specifying any provider data being sent through the intervening access node and a corresponding subscription rate; and
 program instructions stored in the memory and implementing a method to decrease a rate to an adjacent node when a requestor decreases a requestor subscription rate such that all the rates along a common transmit path from a provider are optimized to maximize available bandwidth, and wherein the common transmit path ends at a first intervening access node and two different transmit paths, a first transmit path and a second transmit path, communicate the provider data from the first intervening access node, such that the provider data is communicated from the provider, through the common transmit path to the first intervening access node at the second subscription rate, and from the first intervening access node through the first transmit path at the first subscription rate, and from the first intervening access node through the second transmit path at the second subscription rate.

12. The embedded intervening access node as defined in claim 11, wherein the provider is providing one or more web services and wherein provider data from the provider relates to the one or more web services.

13. The embedded intervening access node as defined in claim 11, wherein the request information comprises a data ID identifying data being received, a next node describing where the data being received is to be sent and a subscription rate of the data being received.

14. The embedded intervening access node as defined in claim 11, wherein the embedded intervening access node is further programmed to operate as a protocol converter.

15. A system for optimizing network bandwidth based on subscription rates from a plurality of requestors, the system comprising:
 a provider that provides provider data;
 a first requestor that has requested the provider data at a first subscription rate;
 a second requestor that has requested the provider data at a second subscription rate, wherein the second subscription rate is higher than the first subscription rate; and
 one or more intervening access nodes, wherein each intervening access node includes request information specifying any provider data being sent through the intervening access node and a corresponding subscription rate, and wherein the one or more intervening access nodes are configured to decrease the rate to an adjacent node when a requestor decreases a requestor subscription rate such that all the rates along a common transmit path from the provider are optimized to maximize available bandwidth, and wherein the common transmit path ends at a first intervening access node and two different transmit paths communicate the provider data to the first requestor and the second requestor from the first intervening access node, such that the provider data is communicated from the provider, through the common transmit path to the first intervening access node at the second subscription rate, and from the first intervening access node to the first requestor at the first subscription rate, and from the first intervening access node to the second requestor at the second subscription rate.

* * * * *

UNITED STATES PATENT AND TRADEMARK OFFICE
CERTIFICATE OF CORRECTION

PATENT NO. : 7,502,321 B2 Page 1 of 1
APPLICATION NO. : 11/053558
DATED : March 10, 2009
INVENTOR(S) : Michael L. Howard et al.

It is certified that error appears in the above-identified patent and that said Letters Patent is hereby corrected as shown below:

In col. 1, line 44 please replace "of" with --or--.
In col. 3, line 16 please replace "requester" with --requestor--.
In col. 3, line 55 please replace "requester" with --requestor--.
In col. 3, lines 63-64 please replace "requesters" with --requestors--.
In col. 3, line 65 please replace "requesters" with --requestors--.
In col. 4, line 18 please replace "requesters" with --requestors--.
In col. 5, line 67 please replace "requesters" with --requestors--.
In col. 6, line 6 please replace "requesters" with --requestors--.
In col. 6, line 53 please replace "requesters" with --requestors--.
In col. 8, line 11 please replace "NextNode2If" with --NextNode2. If--.
In col. 8, line 15 please replace "500Hz" with --500 Hz--.
In col. 8, line 50 please replace "requester" with --requestor--.
In col. 9, line 64 please replace "requester" with --requestor--.
In col. 10, line 1 please replace "requesters" with --requestors--.
In col. 10, line 20 please replace "requesters" with --requestors--.

Signed and Sealed this

Fifteenth Day of September, 2009

David J. Kappos
*Director of the United States Patent and Trademark Office*